United States Patent
Coffield

(10) Patent No.: US 8,329,281 B2
(45) Date of Patent: Dec. 11, 2012

(54) LOAD BEARING FABRIC ASSEMBLY AND METHOD OF MAKING A LOAD BEARING FABRIC ASSEMBLY

(75) Inventor: Timothy P. Coffield, Grand Rapids, MI (US)

(73) Assignee: Illinois Tool Works Inc., Glenview, IL (US)

( * ) Notice: Subject to any disclaimer, the term of this patent is extended or adjusted under 35 U.S.C. 154(b) by 1044 days.

(21) Appl. No.: 11/070,771

(22) Filed: Mar. 2, 2005

(65) Prior Publication Data

US 2006/0024474 A1 Feb. 2, 2006

Related U.S. Application Data

(63) Continuation-in-part of application No. 10/903,947, filed on Jul. 30, 2004, now abandoned.

(51) Int. Cl.
*B32B 3/10* (2006.01)
(52) U.S. Cl. ........................................ 428/131
(58) Field of Classification Search .............. 428/131, 428/132, 134, 135; 273/12; 43/9.95; 52/660; 297/8, 45, 382; 5/93.1, 95, 98.1, 98.3, 120, 5/122, 123
See application file for complete search history.

(56) References Cited

U.S. PATENT DOCUMENTS

| | | | |
|---|---|---|---|
| 5,380,034 A * | 1/1995 | Wilson | 280/657 |
| 6,035,901 A | 3/2000 | Stumpf et al. | |
| 6,059,368 A | 5/2000 | Stumpf et al. | |
| 6,125,521 A | 10/2000 | Stumpf et al. | |
| 6,386,634 B1 | 5/2002 | Stumpf et al. | |
| 6,540,950 B1 | 4/2003 | Coffield | |
| 6,842,959 B2 | 1/2005 | Coffield et al. | |
| 2002/0106479 A1 * | 8/2002 | Coffield et al. | 428/99 |
| 2003/0034682 A1 * | 2/2003 | Stumpf et al. | 297/316 |
| 2003/0137179 A1 | 7/2003 | Coffield | |
| 2004/0142619 A1 | 7/2004 | Ueno et al. | |

FOREIGN PATENT DOCUMENTS

| | | |
|---|---|---|
| GB | 1222 908 | 2/1971 |
| GB | 2 364 951 | 2/2002 |

* cited by examiner

*Primary Examiner* — Mark Ruthkosky
*Assistant Examiner* — Linda Chau
(74) *Attorney, Agent, or Firm* — Mark W. Croll; Paul F. Donovan

(57) ABSTRACT

A load bearing fabric assembly having a frame, a carrier and a load bearing fabric. The load bearing fabric is attached directly to the carrier. The frame defines view ports to enable visual inspection of the junction between the carrier and the load bearing fabric after the carrier and fabric have been mounted to the frame. A method of manufacturing the carrier for such a load bearing fabric assembly includes the steps of: (a) placing the fabric inside a mold with at least a portion of the fabric directly engaging the surface of the mold; (b) injecting a molten thermoplastic into the mold to form the carrier, the molten thermoplastic having a melt point greater than that of the fabric; and (c) permitting the molten thermoplastic to cure to form a carrier directly on the fabric. In one embodiment, the fabric is positioned so that the entry of molten thermoplastic urges the fabric against a surface of the mold cavity.

17 Claims, 5 Drawing Sheets

LOAD BEARING FABRIC ASSEMBLY AND METHOD OF MAKING A LOAD BEARING FABRIC ASSEMBLY

This is a continuation-in-part of U.S. application Ser. No. 10/903,947, filed Jul. 30, 2004 now abandoned by Coffield.

BACKGROUND OF THE INVENTION

The present invention relates to load bearing fabric assemblies and methods for securing a load bearing fabric to a support structure.

"Load bearing fabrics" are high strength, highly durable textiles typically woven from TPE (thermoplastic elastomer) monofilaments and conventional yarns. Load bearing fabrics can have greater strength and durability characteristics than spring steel and other conventional load bearing materials. In addition to enhanced strength and durability, load bearing fabrics are lightweight and typically relatively elastic. Load bearing fabrics are visually appealing and therefore are often exposed during use.

Load bearing fabrics must be properly attached to a support structure to provide the desired strength and durability. One known method for attaching a load bearing fabric to a support structure is to use a pair of interfitting attachment components, generally referred to as a "carrier" and a "frame." In this method, the carrier is attached to the fabric and the frame is attached to the support structure. The combined carrier and fabric are intersecured with the frame. In many conventional applications, the carrier is installed within the frame so that the fabric is held in a stretched condition. In some applications, the action of installing the carrier within the frame causes the stretching in the fabric to occur. In other applications, the fabric is stretched before installation of the carrier within the frame. In any event, the stretch applied to the fabric stresses the fabric and the attachment of the load bearing fabric to the carrier. If improperly attached, the fabric may separate from the carrier. For example, the bond itself may fail or the fabric may unravel or separate along the periphery of the fabric.

One widely used method for intersecuring the carrier and the fabric is to mold the carrier directly onto the fabric. With this method, the fabric is typically placed within a mold and the carrier is molded with TPE around the fabric. The fabric is thus encapsulated within the carrier. Conventional knowledge indicates that the melt temperature of the TPE used to make the carrier must be about the same as or lower than that of the TPE monofilaments in the fabric. Otherwise, the heat of the molten material may cause the fabric to deteriorate or decay. This requirement restricts the type of TPE used for the carrier to those having a particular melt temperature. Since the stiffness of TPE typically increases as the melt temperature of the TPE decreases, the stiffness of the carrier is thereby limited by the TPE used within the load bearing fabric.

In some applications, it would be advantageous to be able to vary the stiffness of a carrier while using the same fabric. Thus, an improved method for binding the fabric to the carrier is highly desirable.

After the fabric is bonded to the carrier, visual inspection of the bond between the carrier and the fabric may display certain defects. For example, a visual inspection may be able to detect if the fabric was not properly encapsulated by the carrier. However, in some circumstances, the fabric may appear to be properly bonded to the carrier but in fact is not. In these situations, after the carrier is installed within the frame and the fabric has been further stressed, the fabric may pull out of the carrier. A means for detecting insufficient encapsulation of the fabric, unraveling of the fabric or other attachment defects after the carrier is installed in the frame is thus also highly desirable.

SUMMARY OF THE INVENTION

The aforementioned problems are overcome by the present invention wherein a load bearing fabric assembly having a carrier and a frame is provided with multiple view ports so that the junction of the load bearing fabric and the carrier can be easily inspected when the carrier is installed within the frame.

In one embodiment, the view ports are located generally on the same plane and are spaced equally about the interior of the frame when they are hidden from view during normal use. In another embodiment, the view ports are not equidistant from each other and may be arranged about the exterior of the frame. Additionally, the view ports may be on multiple planes, thereby allowing the inspection of the junction between the load bearing fabric and the carrier at different positions depending upon the location of the junction.

Formation of the carrier is accomplished by injecting molten TPE or other molten thermoplastic into a chamber within a mold. The mold is provided with coolant tubes to assist in solidifying the molten thermoplastic. Prior to injection of the molten thermoplastic into the chamber, the load bearing fabric is placed within the chamber. The terminus of the fabric and at least a portion of the fabric are placed against a wall of the chamber. The load bearing fabric is positioned so that the molten thermoplastic when injected into the chamber urges the fabric against the wall of the chamber. Because the load bearing fabric is positioned against the wall, and the wall is at a temperature less than that of the molten thermoplastic, the temperature of the load bearing fabric against the wall will also be less than that of the molten thermoplastic.

The temperature differential between the molten TPE or other molten thermoplastic and the load bearing fabric allows the material of the carrier to have a higher melt point than that of the load bearing fabric. The carrier can thus be made of more rigid thermoplastics, allowing the carrier assembly to be used in a variety of applications.

These and other objects, advantages, and features of the invention will be readily understood and appreciated by reference to the detailed description of the preferred embodiment and the drawings.

BRIEF DESCRIPTION OF THE DRAWINGS

FIG. 1A is a detail of a portion of the assembly.

DETAILED DESCRIPTION OF THE DRAWINGS

Figure 1:
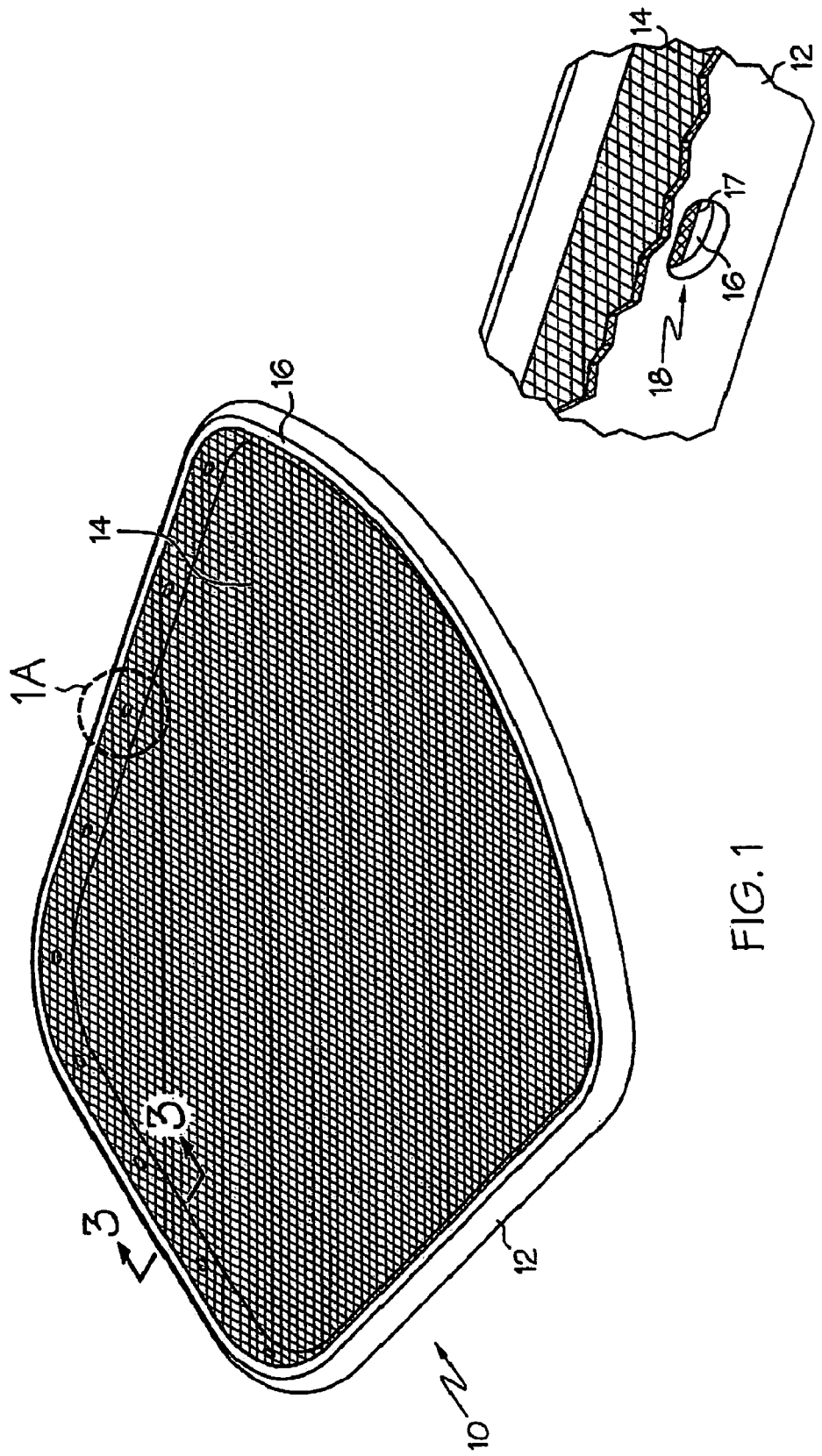
FIG. 1 is a perspective view of a load bearing fabric assembly having a carrier, frame and fabric.

A load bearing fabric assembly intended for use as a chair seat is shown in FIG. 1 and generally designated 10. The assembly 10 generally includes a carrier assembly 15 that is mounted to a frame 12. The carrier assembly 15 includes a load bearing fabric 14 intersecured with a carrier 16. The frame 12 defines a plurality of view ports 18 that permit the connection between the carrier 16 and the load bearing fabric 14 to be visually inspected after the carrier assembly 15 has been secured to the frame 12. Although the present invention is described in connection with a chair seat assembly, the presented invention is well suited for use in a variety of applications incorporating load bearing fabric. For example, the present invention is well suited for use with footwear soles, mattresses, cots, wheelchairs and a variety of other seating applications.

Figure 2:
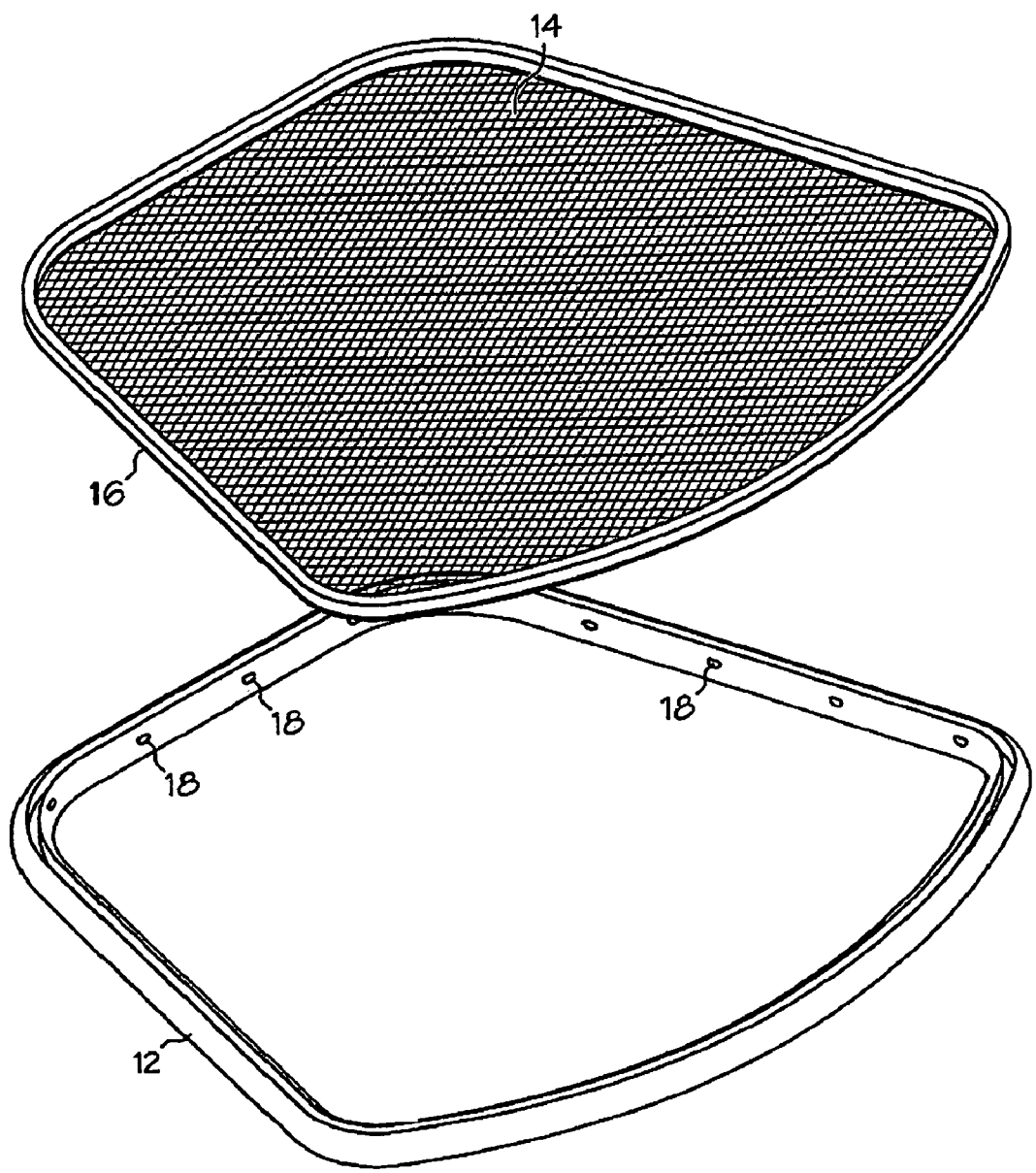
FIG. 2 is an exploded view of the assembly shown in FIG. 1.

As noted above, the load bearing fabric assembly 10 generally includes a frame 12, a carrier 16 and a load bearing fabric 14. The carrier 16 and load bearing fabric 14 are interconnected to form a carrier assembly 15. FIG. 2 shows a partially exploded view of assembly 10 showing the carrier assembly 15 separated from the frame 12.

In this embodiment, the frame 12 is a substantially rigid peripheral frame adapted to be mounted to an underlying support structure (not shown). The frame 12 may be secured to the underlying support structure (not shown) in essentially any conventional manner. As shown, the frame 12 of this embodiment defines a continuous channel 50 into which the carrier 16 is installed. Although continuous in this embodiment, the frame 12 and channel 50 may alternatively be discontinuous, for example, having separate spaced-apart left and right segments. In the described embodiment, the frame 12 is injection molded from a polymer having sufficient rigidity to retain the fabric 14 in the stretch condition. The frame 12 may, however, be manufactured from essentially any material having sufficient strength and durability characteristics. The frame 12 defines a plurality of view ports 18 that penetrate the frame 12 to the channel 50. The view ports 18 permit viewing of a portion of the carrier assembly 15 to assess the connection between the fabric 14 and the carrier 16, as described in more detail below.

Carrier 16 of this embodiment is a continuous peripheral component adapted to be fitted within channel 50. In the illustrated embodiment, the load bearing fabric 14 is attached to carrier 16 by molding the carrier 16 directly onto the peripheral edge of the fabric 14. The carrier 16 may alternatively be attached to the fabric 14 using other methods. For example, the carrier may include two halves that are closed about the fabric and intersecured by adhesives, fasteners or other conventional mechanisms. Although the carrier 16 is continuous in the illustrated embodiment, it may alternatively be discontinuous, for example, including discrete segments that may mount to the frame 12. The term "fabric encapsulation line" is used herein to refer to the junction between the fabric 14 and the carrier 16. In direct molding applications, the fabric encapsulation line is that line along which the fabric merges or joins with the carrier. In other applications, the fabric encapsulation line is that line along which the fabric passes into or otherwise forms a junction with the carrier. Accordingly, the term should not be interpreted to be limited to applications in which the fabric is encapsulated within the fabric through a molding process.

The fabric may be essentially any load bearing fabric and may, for example, include a weave of thermoplastic monofilaments and multifilament yarns. If desired, the strands of the fabric may be welded to one another to enhance the overall strength of the fabric. Welded fabrics are not, however, necessary for use of the present invention. For purposes of disclosure, the figures include only a representation of the fabric and are not intended to provide an accurate illustration of the physical structure of the fabric. In many applications, the fabric will include a significantly tighter weave than shown in the drawings. Further, in many applications, the strands of the fabric will run in different directions than shown in the drawings.

As noted above, carrier assembly 15 is installed within frame 12 in channel 50. FIG. 1A shows the detail of assembly 10. As shown, the frame 12 defines apertures that form the fabric view ports 18. The fabric view ports 18 are arranged to allow visual inspection of the fabric encapsulation line 17 when the carrier assembly 15 is installed on the frame 12. In the illustrated embodiment of the carrier assembly 15, the fabric 14 merges with or joins the carrier 16 and follows along the outer surface of the carrier 16 for a significant distance. The view ports 18 are, however, well suited for use in inspection of the junction in applications where the fabric 16 extends directly into the carrier and does not follow along its outer surface.

Figure 3:
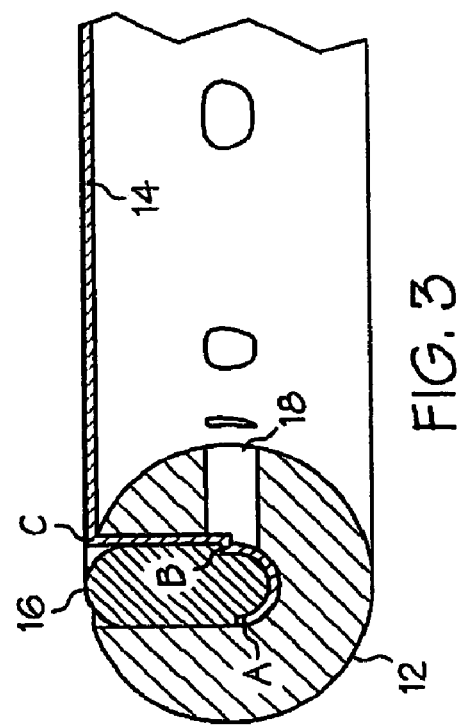
FIG. 3 is a sectional view along line 3-3 shown in FIG. 1.
Figure 6:
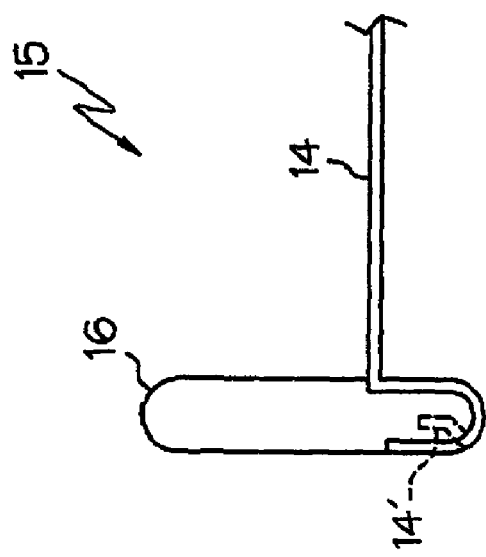
FIG. 6 is a side view of one embodiment of the carrier with the fabric attached.

FIG. 3 is a sectional view along line 3-3 shown in FIG. 1. FIG. 3 shows the carrier 16 inserted within the channel 50 in frame 12. As shown, fabric 14 enters frame 12 at point C. From point C to point B, fabric 14 is not integral with carrier 16, but rather is external to the carrier 16 and is lying against its outer surface. At point B, which coincides with the encapsulation line 17 shown in FIG. 1A, fabric 14 becomes integrally engaged with carrier 16. The fabric 14 remains integrally engaged with carrier 16 until its end at point A. Between points A and B, the fabric 14 may be chemically (e.g. fused) and mechanically bonded to carrier 16. In the illustrated embodiment, the fabric 14 is integral with the carrier 16 and is exposed along the outer surface of the carrier 16 between points A and B. In some applications, portions of fabric 14 within the mold cavity that are not directly in contact with wall may become amalgamated with carrier 16. For example, FIG. 6 shows in phantom lines an embodiment in which the free end of the fabric 14' strays into the body of the carrier 16 away from the outer surface of the carrier 16. In this embodiment, the heat from the molten material may fully melt the free end of the fabric 14'. The amalgamation of the free end of the fabric 14' is generally acceptable provided that a sufficient portion of the fabric 14 follows the outer surface of the carrier 16 beginning at the line of encapsulation.

Referring again to FIG. 3, view port 18 is aligned with point B. Inspection of the encapsulation line 17 is performed by looking through view port 18. By visually inspecting the connection or junction between the fabric 14 and the carrier after the carrier assembly 15 is attached to the frame 12 allows for easy detection of defects in the attachment of the fabric 14 to the carrier 16. View ports 18 shown in FIG. 1 are spaced equidistant from each other with the horizontal center lines in approximately the same plane. However, view ports 18 could also be arranged in many different manners. It may be necessary or desirable to place view ports 18 outside of the same plane and positioned so that the view ports are not equidistant. For example, in the corners of frame 12, it may be prudent to position the view ports higher than at other locations. The view ports may be positioned so as to view cuts in the fabric.

Although the view ports 18 are shown as generally oval and spaced roughly an equal distance part around the frame, the view ports could be of different shapes and sizes and at different locations. For example, the view ports could be in different vertical positions around the frame where the encapsulation line is at different vertical positions around the frame. This permits the bond to be inspected at various locations around the carrier assembly 15. Further, the view ports may be vertically extended to permit viewing of a larger vertical area, and thereby facilitating inspection in applications where the encapsulation line may vary in the vertical direction. Alternatively, the view ports could be at different angles with respect to the fabric in order to facilitate viewing areas of the fabric-carrier attachment. Further, the view ports are shown as being defined on the inside of the frame 12 where they are largely hidden from view during use. The view ports may alternatively be disposed on the outside of the frame or in other locations, as desired.

Figure 4:
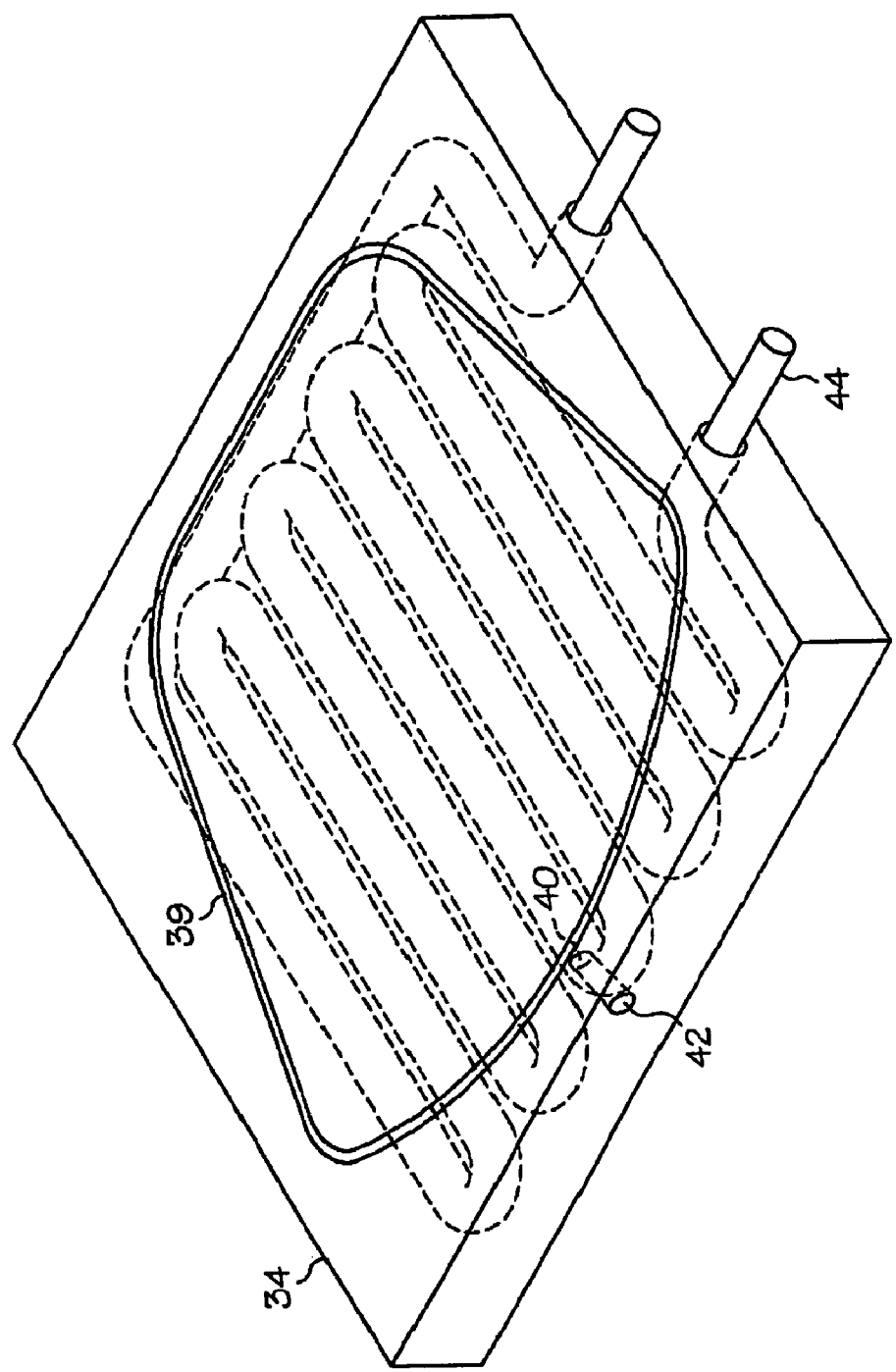
FIG. 4 is a view of the lower half of a mold used for forming the carrier and attaching the fabric to the carrier.

The carrier assembly 15 may be manufactured in accordance with a method that permits the carrier 16 to be manufactured from a TPE having a higher melt point than that of the TPE portions of the fabric 14. This manufacturing process and the associated molding apparatus are described in connection with FIGS. 4-7. FIG. 4 shows the lower portion 34 of a mold for molding the carrier 16 onto the fabric 14. An upper portion of the mold, which is similar to a mirror image of lower portion 34. The upper portion 32 of the mold is partially shown in FIG. 5. In use, the peripheral edge of the fabric 14 is positioned within groove 39, and the lower portion 34 and the upper portion are closed. Molten TPE is injected into mold 34 by way of sprue 42. The molten material enters and flows around groove 39 filling the mold cavity. As the molten material flows around groove 39, its flow front pushes the fabric 14 against the surface of the mold 30. Referring now to FIG. 4, conventional coolant tubes 44 are located within lower portion 34 of the mold 30, and may also be located in the upper portion 32, as desired. A coolant (not shown) is moved through the coolant tubes 44 to cool the mold parts during molding. In use, the cooled mold parts draw heat away from the fabric 14 protecting it from decay and deterioration that may otherwise have occurred as a result of the heat of the molten material. Because of the cooling effect of the mold parts, the molten material may be at a temperature that is substantially higher than the melt temperature of the fabric 14. The precise difference in melt temperature permitted between the carrier material and the fabric material will vary from application to application depending in large part on the temperature of the mold parts. Once the mold cavity is filled, the molten material solidifies to form the carrier 16.

Figure 5:
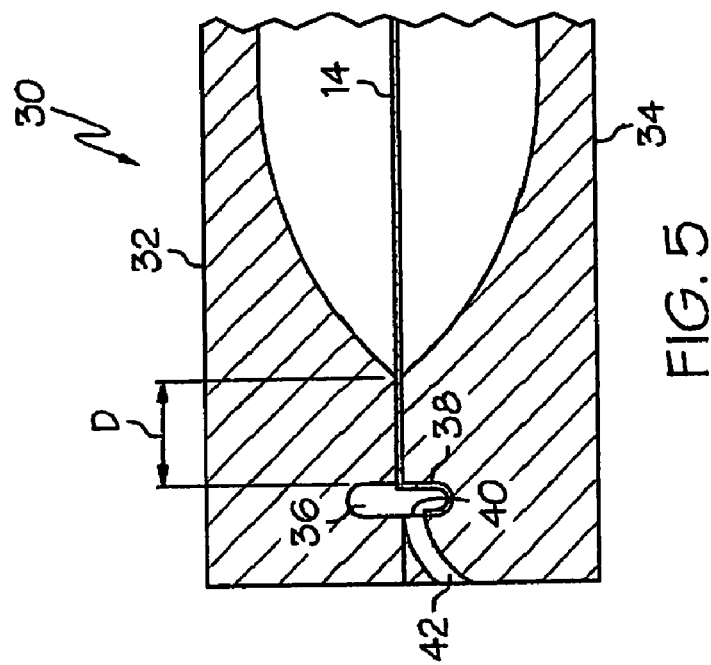
FIG. 5 is a side view of the mold with fabric inserted therein.

FIG. 5 shows mold 30 for forming carrier 16 and securing fabric 14 to carrier 16. Mold 30 has upper portion 32 and lower portion 34. Over the distance indicated as D of the mold 30, the upper portion 32 and lower portion 34 define a space of approximately 0.02 inch apart. When mold 30 is closed, this space in wide enough to prevent the fabric 14 from being crushed while at the same time being narrow enough so that the fabric 14 essentially closes or shuts off the mold cavity. This "shut-off" region may vary in size, shape and location from application to application.

As noted above, fabric 14 is placed within the mold 30 so that its peripheral marginal portion is located in the mold cavity defined by the upper portion 32 and lower portion 34. More specifically, the fabric 14 is arranged in the mold 30 so that the terminus of fabric 14 and a portion of fabric 14 are draped against lower wall 38 of chamber 36. Fabric 14 is positioned so as not to cover inlet 40 of sprue 42. As molten TPE or other molten thermoplastic enters chamber 36, a skin forms over the exterior front surface of the molten TPE. This skin assists in urging fabric 14 against the exterior wall of chamber 36. After fabric 14 is fully engaged with the exterior wall of chamber 36, the TPE begins to cure and bonds with fabric 14. The TPE eventually fills the entire chamber. The coolant tubes 44 circulate coolant that lowers the temperature of lower portion 34. Thus, as fabric 14 is maintained in juxtaposition with lower wall 38, the fabric 14 will be maintained at a temperature below that of the molten TPE. Generally, the linear distance where fabric 14 is in contact with the mold surface should be about 0.20 inch or greater. This distance may, however, vary from application to application depending primarily on the characteristics of the fabric and the carrier and the load requirements for the assembly. For example, lesser distances may be necessary when the fabric includes welded strands and greater distances may be necessary when larger loads are to be supported. As a result of the cooling provided by the mold 30, the TPE monofilaments of fabric 14 do not fully melt upon contact with the molten TPE. Rather, the TPE monofilaments maintain their structure and the fabric 14 becomes integral with carrier 16. As can be seen, because the fabric 14 is maintained at a temperature below that of the melt temperature of the TPE used in carrier 16, the melt temperature of the TPE used in carrier 16 can be higher than that of the TPE monofilaments within carrier 16. By using TPE with a higher melt point, the carrier 16 can be made of more rigid TPE, and thus improve the overall strength and durability of the assembly 10. Although the present invention is described in connection with an embodiment of the carrier that is manufactured from TPE, the present invention is not limited to TPE carriers. The carrier of the present invention may be manufactured from essentially any thermoplastic, including polyester (e.g. PET, PBT or blends of PET/PBT), TPE and nylon. Examples of suitable polyesters include, without limitation, Rynite, which is available from DuPont, and Petra, which is available from Honeywell. Examples of suitable TPEs include, without limitation, Arnitel, which is available from DSM, and Hytrel, which is available from DuPont.

Figure 7:
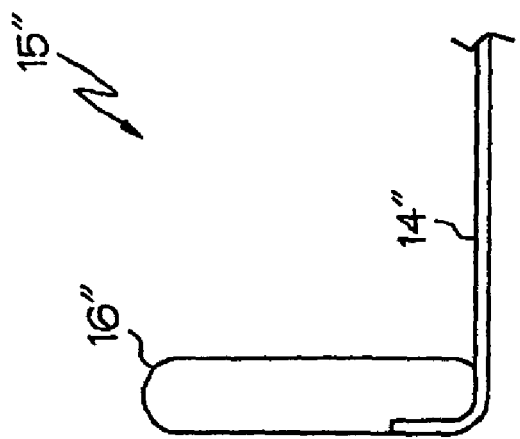
FIG. 7 is a side view of another embodiment of the carrier with the fabric attached.

FIG. 6 shows a cross-sectional view of the carrier assembly 15 with the carrier 16 integrally attached to the fabric 14. In this embodiment, the line of encapsulation is somewhat below the center of carrier 16. As shown, the fabric 14 wraps around to the opposite side of carrier 16. The fabric may, however, enter the carrier at different locations. For example, FIG. 7 shows an alternative construction of the carrier assembly 15". In this alternative, the fabric 14" enters the carrier 16" at the bottom and then wraps around the opposite side of the carrier 16". In both illustrated embodiments, the fabric follows along the outer surface of the carrier 16, 16" for a substantial distance beginning at the line of encapsulation. As can be appreciated, the location of fabric 14 on the carrier 16 can be varied beyond the illustrated alternative embodiments. For example, fabric 14 could alternatively be located at the top of carrier 16.

As noted above, the cooling effect of the mold surface helps to prevent damage to the fabric 14 during the carrier 16 molding process. To help ensure engagement of the fabric against the mold surface, it has been found that the best location of fabric 14 with respect to carrier 16 is in configuration such that the molten TPE or other molten thermoplastic when it flows into chamber 36 forces fabric 14 against lower wall 38. For example, if it is desirable to have the fabric 14 follow against the lower mold surface, the sprue 42 is positioned in the mold so that molten material will be introduced into the mold cavity above the fabric 14. The molten material will then flow against and push the fabric 14 down into contact with the mold surface. Alternatively, lifters or slides could be provided within mold 30 to maintain fabric 14 against lower wall 38. Lifters or slides could also be desirable in portions of mold 30 where the fabric 14 tends to fold or otherwise lift away from lower wall 38. For example, it might be preferred to use lifters or slides at the corners of carrier 16 or where there are cuts in fabric 14 to insure contact between fabric 14 and lower wall 38.

The above description is that of a preferred embodiment of the invention. Various alterations and changes can be made without departing from the spirit and broader aspects of the invention as defined in the appended claims, which are to be interpreted in accordance with the principles of patent law including the doctrine of equivalents. Any reference to claim elements in the singular, for example, using the articles "a," "an," "the" or "said," is not to be construed as limiting the element to the singular.

The embodiments of the invention in which an exclusive property or privilege is claimed are defined as follows:

1. A load bearing fabric assembly comprising:
   a carrier having a top, a bottom and a side extending between said top and said bottom, said carrier further having an outer surface, and said carrier being manufactured from a first thermoplastic having a first melt temperature;
   a load bearing fabric being manufactured at least in part from a second thermoplastic having a second melt temperature, such that said first melt temperature is higher than said second melt temperature, wherein a portion of said load bearing fabric lies against said outer surface of said carrier, said load bearing fabric being further attached to said carrier at a junction located on said side of said carrier, said junction being further defined as a location at which said load bearing fabric integrally joins with said carrier, and wherein another portion of said load bearing fabric wraps around said bottom of said carrier; and
   a component having a channel configured for receiving said carrier and said fabric for supporting said carrier and said fabric, said channel having an open end, a bottom and a wall extending therebetween, such that said portion of said fabric lying against said outer surface of said carrier is hidden from view by said wall of said channel when said carrier and said fabric are received by said channel, and wherein said component defines a first view port extending through said wall of said channel, such that said first view port is positioned through said component and said wall of said channel at a location between an entry point of said open end of said channel where said channel receives said carrier and said fabric, and said bottom of said channel where said portion of said load bearing fabric wrapped around said bottom of said carrier rest, wherein a centerline of said first view port is aligned with said junction and is substantially perpendicular to said wall of said carrier, whereby said view port permits visual inspection of said junction through said view port when said carrier and said fabric are received by said component, said component being securable to a support structure other than by use of said view port.

2. The load bearing fabric assembly of claim 1 wherein said component defines a second view port for viewing said junction.

3. The load bearing fabric assembly of claim 2 wherein said first view port and said second view port are defined in said component in different planes.

4. The load bearing fabric assembly of claim 3 wherein said component is further defined as a frame, and said first view port and said second view port being defined as apertures in said frame.

5. The load bearing fabric assembly of claim 4 where said frame has an interior and said first view port is located on said interior.

6. The load bearing fabric assembly of claim 2 wherein said load bearing fabric is attached to said carrier along a line which forms said junction; and
   wherein said first and second view ports are aligned to permit viewing of at least portions of said junction.

7. The load bearing fabric assembly of claim 6 wherein said component is a frame that defines said channel, said carrier being fitted within said channel such that said junction extends into said channel, said view ports extending through said frame to said channel to permit viewing of said junction.

8. The load bearing fabric assembly of claim 6 wherein said component is further defined as a frame including an interior surface on said channel, said first view port and said second view port defined along said interior surface of said channel.

9. The load bearing fabric assembly of claim 1, said carrier formed from the first thermoplastic material in a mold while the first thermoplastic material is above the first melt point; said load bearing fabric attached to the first thermoplastic material while the first thermoplastic material is above the first melt point, wherein at least one portion of the load bearing fabric is positioned to engage a surface of the mold as said carrier is formed, whereby the portion of the load bearing fabric is cooled by the mold.

10. The load bearing fabric assembly of claim 9 wherein the temperature of the at least one portion of the load bearing fabric is below the second melt point as the load bearing fabric is in contact with the first thermoplastic material while the first thermoplastic material is at a temperature above the first melt point.

11. The load bearing fabric assembly of claim 9 wherein a terminus of the load bearing fabric is attached to the carrier.

12. The load bearing fabric assembly of claim 1, said load bearing fabric being encapsulated along said outer surface of said carrier at said junction.

13. The load bearing fabric assembly of claim 12 wherein said component is a frame, said carrier being interfitted with said frame.

14. The load bearing fabric assembly of claim 13 wherein said first view port is located at a first location, wherein said carrier has a second view port for viewing said junction at a second location different from said first location.

15. The load bearing fabric assembly of claim 14 wherein said first view port and said second view port are in different planes.

16. The load bearing fabric assembly of claim 14 wherein said frame defines said channel, said carrier being fitted within said channel.

17. The load bearing fabric assembly of claim 16 wherein said frame includes an interior surface, said first view port and said second view port defined in said interior surface.

* * * * *